UNITED STATES PATENT OFFICE.

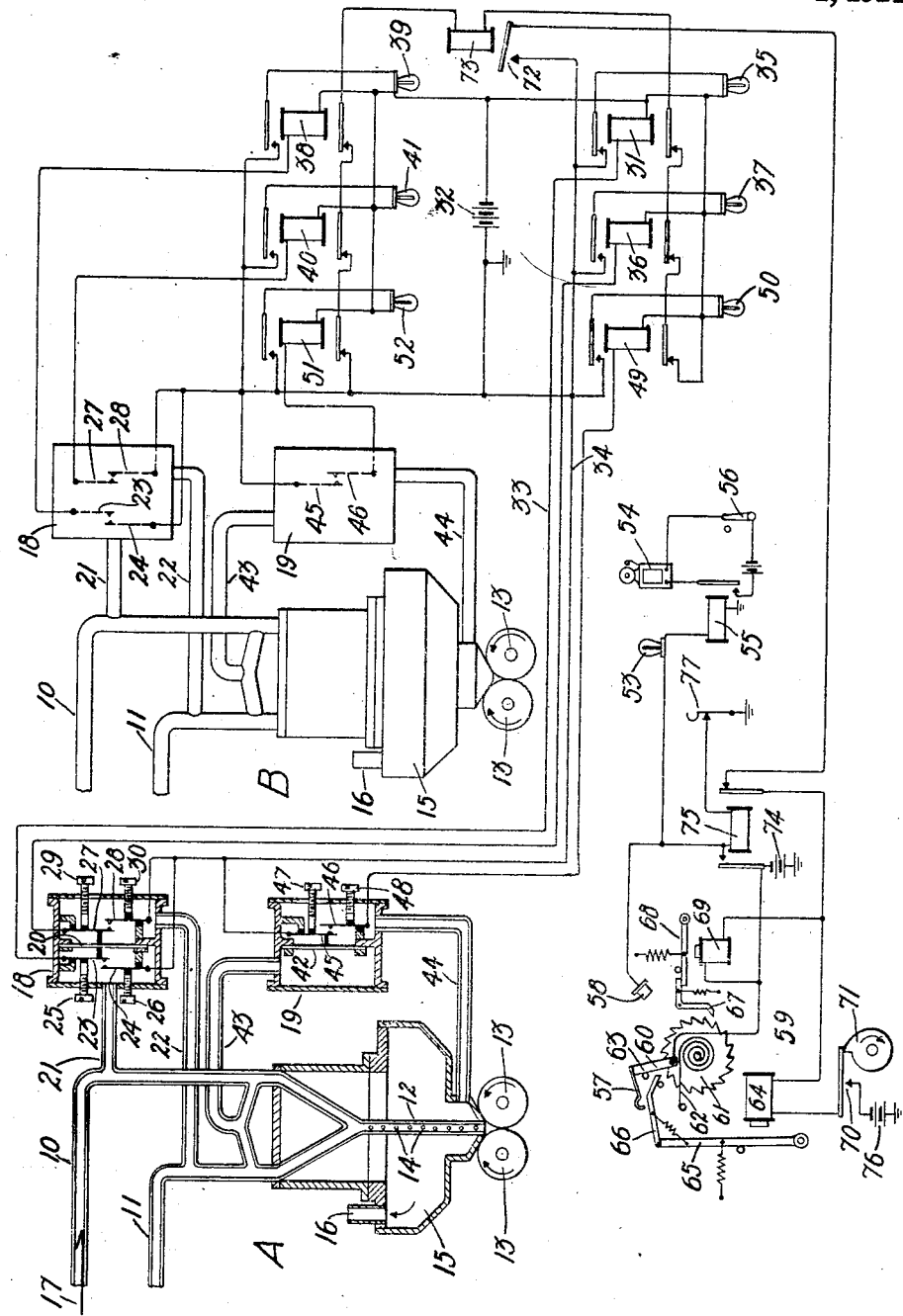

GEORGE F. ATWOOD, OF NEWARK, NEW JERSEY, ASSIGNOR TO WESTERN ELECTRIC COMPANY, INCORPORATED, OF NEW YORK, N. Y., A CORPORATION OF NEW YORK.

SIGNALING SYSTEM.

1,367,113.  Specification of Letters Patent.  Patented Feb. 1, 1921.

Application filed June 5, 1919. Serial No. 301,860.

*To all whom it may concern:*

Be it known that I, GEORGE F. ATWOOD, a citizen of the United States, residing at Newark, in the county of Essex, State of New Jersey, have invented certain new and useful Improvements in Signaling Systems, of which the following is a full, clear, concise, and exact description.

Two receiving stations A and B, each having a pair of tubes 10 and 11 extending from different sending stations (not shown) are illustrated. The tubes 10 and 11 at each receiving station open into a common delivery tube 12, the lower end of which terminates between a pair of soft rubber rollers 13 normally in close contact and which serve to remove a ticket from the delivery tube 12 without admitting air thereto. The tube 12 is perforated as at 14 and except for its lower end which extends between the rollers 13, is located within an airtight casing 15, having a pipe 16 extending therein through which air flowing through the tubes 10, 11 and 12 is exhausted by any suitable means (not shown). Airtight joints are provided where the tubes 10, 11 and 12 extend through the casing 15. The particular delivery apparatus shown corresponds with that shown in a patent to Amos F. Dixon, No. 1,065,924, issued July 1, 1913, and while arrangement is especially satisfactory, any other suitable delivery apparatus may be used to facilitate the removal of the tickets from the delivery tube 12.

In ticket distributing systems of the type shown the tickets 17 are usually of rectangular form and are bent transversely to form a flap before insertion in the sending tube. The air is exhausted from the tube in advance of the ticket and the resultant higher air pressure at the rear of the ticket acts against the flap to cause the forward movement of the ticket. Under normal conditions the ticket 17 is moved forward until it reaches the bottom of the delivery tube 12 at the desired receiving station, where it is seized by the rollers 13 and removed from the tube 12.

Tickets occasionally become stuck in the tubes 10 and 11 and also in the delivery tube 12 and although a blocked ticket will often be released within a few moments, it is desirable to indicate the presence of a blockade and its location immediately upon the occurrence thereof, so that steps may be taken at once to remove the blockade before other tickets become involved therein. To furnish such indications a pair of pneumatic relays 18 and 19 are provided for each of the receiving stations. The relay 18 comprises an airtight casing divided into two compartments by an airtight flexible diaphragm 20 so mounted as to form an airtight partition between the compartments. The left-hand compartment is connected with the tube 10 by a communicating tube 21 and the right-hand compartment is connected with the tube 11 by a similar communicating tube 22. In the normal operation of the pneumatic system, the air pressure in the tubes 10 and 11 is substantially the same, in which case the diaphragm 20 remains in the central position, since the pressure on opposite sides thereof is substantially the same. Should a ticket 17 become blocked in the tube 10, however, the pressure in the tube 10 in advance of the ticket is reduced in comparison with the air pressure in the tube 11 so that the diaphragm 20 is bowed toward the left. A pair of spring contacts 23 and 24 are mounted in the left-hand compartment of the relay 18, and adjusting screws 25 and 26 regulate the relative movement of the contact 23 necessary to engage it with the contact 24. A similar pair of contacts 27 and 28 are mounted in the right-hand compartment, and provided with adjusting screws 29 and 30, for a like purpose. Movement of the diaphragm moves the contacts 23 and 27 accordingly, and the adjusting screws 25 and 29 can also be used to regulate the difference in pressure in the two compartments necessary to effect a given movement of the contacts 23 and 27 respectively.

The relay 18 is preferably so adjusted that the difference in pressure necessary to engage the contacts 23 and 24 or 27 and 28, respectively, will be sufficiently high so that minor fluctuations occurring in the tubes 10 and 11 will not engage such contacts, but at the same time sufficiently low so that the difference in pressure due to the blockade of a ticket in either one of the tubes 10 or 11 will engage the appropriate pair of contacts. Assuming that a blockade occurs in tube 10, contacts 23 and 24 are engaged, thereby completing an operating circuit for an electromagnetic relay 31 individual to these contacts. This circuit extends from battery 32, winding of relay 31, conductor 33, contacts 23 and 24, and a common conductor 34 back to battery. The resultant operation of relay 31, thereby completes a circuit for the signal lamp 35; the illumination of which indicates that a blockade exists in the tube 10 of station A. This circuit extends from battery 32, lamp 35, upper armature and alternate contact of relay 31 and conductor 34 to battery. A relay 36 and lamp 37 are similarly controlled by the contacts 27 and 28 of station A, and illumination of the lamp 37 indicates a blockade in the tube 11 of station A. The contacts 23 and 24, and contacts 27 and 28 of station B respectively control a relay 38 and lamp 39, and a relay 40 and lamp 41; illumination of lamp 39 indicating a blockade in the tube 10 of station B, and illumination of lamp 41 indicating a blockade in tube 11 thereof.

The pneumatic relay 19 is also divided into two compartments by a flexible diaphragm 42 forming an air-tight partition between the compartments, and the left-hand compartment is connected to both of the tubes 10 and 11 just above their point of connection with the delivery tube 12 by a communicating tube 43. The right-hand compartment is similarly connected with the casing 15 near the lower end of the delivery tube 12 by a communicating tube 44. In event of blockades occurring in the delivery tube 12, the air pressure in the casing 15 will be materially reduced in relation to the air pressure in the tubes 10 and 11 and bow the diaphragm 42 to the right. A pair of contacts 45 and 46 mounted in the right-hand compartment of relay 19 and having adjusting screws 47 and 48, as described for the relay 18, are engaged as a consequence and complete an operating circuit for an individual relay 49, controlling a signal lamp 50. Illumination of the lamp 50 indicates the presence of a blockade in the delivery tube 12 of station A. The contacts 45 and 46 of the pneumatic relay 19 of station B control a relay 51 and lamp 52, the illumination of the lamp 52 similarly indicating the presence of a blockade in the delivery tube 12 of station B.

It will be noted that a blockade occurring in the delivery tube 12 does not operate the relay 18 since the pressure in the tubes 10 and 11 is substantially the same under this condition. An additional blockade occuring in tube 10 or 11 of that station would, however, operate the relay 19 thereof to indicate the additional stoppage, in the same manner as previously described.

As soon as a blockade is cleared, either with or without aid, the relay 18 or 19 affected returns to its normal position, disengaging the engaged contacts. Assuming the blockade was in tube 10 of station A, upon clearance thereof the contacts 23 and 24 of relay 18 are disengaged, deënergizing relay 31, which releases, opening the circuit of lamp 35, thus effecting the extinguishment thereof, and indicating that tube 10 is again in proper condition.

Should a blockade or blockades continue beyond the period in which they should clear themselves, or be cleared by an attendant whose duty it is to remove blockades, it is desirable to indicate this fact by a special signal which is not operated until the blockade has continued beyond this predetermined interval, which might in practice be about a half minute. A signal lamp 53 has been shown for this purpose and might in practice be located at a point convenient for the observation of the attendant, his supervisor, or both. If desired an audible alarm 54 arranged in a local circuit may also be provided and controlled through a relay 55 included in the operating circuit of the lamp 53. In this case a hand switch 56 may be included in the local circuit of the audible signal 54, and closed or opened according to whether or not it is desired to have the audible signal 54 actuated, in unison with the illumination of the lamp 53.

The signal lamp 53 is initially illuminated upon the completion of a circuit therefor which is closed upon the engagement of contacts 57 and 58 of a rotary stepping switch 59. The contact 57 is mounted on an arm 60 carried by a toothed wheel 61, normally held in the position shown by a spring 62, which serves to normally hold the arm 60 against a stop 63. A stepping magnet 64 controls the movement of an arm 65, carrying a stepping pawl 66 which engages the teeth of the wheel 61 to move it forward one step upon each energization of the magnet 64. A detent pawl 67 is normally held out of engagement with the wheel 61, by an armature 68, the movement of which is controlled by a magnet 69. The magnet 69 is normally deënergized but is energized upon the occurrence of a blockade and maintained energized so long as such blockade continues, or until the illumination of the signal lamp 53, as hereinafter explained. Accordingly, so long as the magnet 69 is energizing the detent 67 is in a position to engage the teeth of the wheel 61 and to hold this wheel in any position to which it is moved by the stepping pawl 66. The operating circuit of the stepping magnet extends through a contact 70, which is actuated by a constantly rotating cam 71 to close such contact momentarily at predetermined time intervals, for example, every six seconds.

The operating circuits of the stepping magnet 64 and the magnet 69 also extend through a normally open contact 72 controlled by a relay 73 common to the system. The relay 73 is normally energized over a circuit extending from battery 32, serially through the normal contacts of the lower armatures of relays 49, 36 and 31, winding of relay 73, and serially through the normal contacts of the lower armatures of relays 38, 40 and 51 to the other side of battery. The relay 73 while energized maintains the contact 72 open and prevents the energization of the magnets 64 and 69 so long as no blockades are present. As soon as a blockade occurs, however, the operation of the individual relay affected, for example, relay 31, in addition to closing the circuit for its lamp 35, opens its normal lower armature contact, thereby interrupting the circuit of relay 73, and effecting the closure of contact 72.

The circuit to operate relay 69 is thereby completed, extending from grounded battery 74, winding of relay 69; normal right-hand armature of a relay 75, contact 72 and conductor 34 to ground, and detent pawl 67 accordingly moves into engagement with wheel 61. Upon the next closure of contact 70, the circuit for the stepping magnet 64 is momentarily closed and the wheel 61 moved forward one tooth, and held in this position by the pawl 67. This circuit extends from grounded battery 76, contact 70, winding of stepping magnet 64, right-hand normal contact of relay 75, contact 72 and conductor 34 to ground. The contact 72 remains closed so long as any blockade continues and the operating circuit of magnet 64 is again momentarily completed on the next closure of contact 70, six seconds after the first completion. The wheel 61 is thereby moved forward another tooth and assuming that the blockade continues for at least four more six-second intervals thereafter, the wheel 61 will be moved forward six teeth. Upon the last step of the six, the contacts 57 and 58 will be engaged, completing the initial energizing circuit for the signal lamp 53 and the relay 55, this circuit extending from grounded battery, 74, arm 60, contacts 57 and 58, lamp 53, and winding of relay 55 to ground. Relay 75 is also operated at this time over a circuit extending from grounded battery 74, arm 60, contacts 57 and 58, winding of relay 75 and normally closed key 77 to ground.

The energization of relay 75 completes a locking circuit for itself extending from grounded battery 74, alternate contacts of left-hand armature and winding of relay 75, and key 77 to ground, and also a parallel circuit from the alternate contact of its left-hand armature through lamp 53 and winding of relay 55 to ground. Energization of relay 75 also opens at its right-hand armature the circuits for the magnets 64 and 69, preventing further forward movement of the wheel 61, and effecting the retraction of the detent pawl 67 therefrom, whereupon the spring 62 returns the wheel 61 to its normal position, disengaging the contacts 57 and 58. Under these conditions stepping of the wheel 61 will not take place independent of the additional time during which the blockade may continue. The signal lamp 53 is however maintained lighted, and the audible signal 54 will also be operated (assuming the switch 56 is closed) until the attendant or supervisor ascertains that the blockade has been cleared, whereupon he will operate the key 77. The relay 75 is thereby deënergized and effects the extinguishment of the signal lamp 53 and the deënergization of relay 55, with a consequent opening of the local circuit of the audible signal 54. The normal contact of the right-hand armature of relay 75 is also closed in this operation, conditioning the circuits of the magnets 64 and 69 for subsequent operation as previously described.

Should the blockade be cleared before the engagement of the contacts 57 and 58, the individual relay of the tube affected, for example relay 31, would be released, extinguishing its lamp 35, and restoring the operating circuit of relay 73, assuming that no other blockades exist. The consequent operation of relay 73 opens the contact 72, thereby preventing further energization of the stepping magnet 64, and deënergizing magnet 69, thereby effecting the release of the detent pawl 67 and restoring the wheel 61 to its normal position. In this situation the signal lamp 53 and the audible signal 54 will not be operated, the blockade or blockades having all been cleared within the allowed interval.

This invention relates to signaling systems and more particularly to signaling systems applicable to pneumatic despatch systems to indicate the occurrence of blockades therein.

The principal object of the invention is to provide a signaling system to indicate the occurrence and location of blockades in a pneumatic despatch system in which blockades continuing for longer than a predetermined interval will operate an additional signal to indicate this fact. In accordance with this object a feature of the present invention resides in the provision of signals and means controlled by blockades occurring in the pneumatic system controlling the operation of such signals, together with an additional signal and means actuating such additional signal, in event the pneumatic despatch system is blockaded in excess of a predetermined consecutive interval.

The drawing diagrammatically illustrates one embodiment of the present invention as applied to a pneumatic ticket distributing system suitable for use in telephone exchanges.

What is claimed is:

1. A signaling system comprising a guideway, means to propel material to be conveyed along the guideway, a signal to indicate the condition of the propelling means, means to change the condition of the signal on a change in the condition of the propelling means, a second signal, and means to change the condition of the second signal on the continuance of the changed condition of the propelling means in excess of a determined interval.

2. A signaling system comprising a plurality of guideways, means to propel material to be conveyed along the guideways, a signal to indicate the condition of the propelling means in one of the guideways relative to the condition of the propelling means in another of the guideways, means to change the condition of the signal on a change in the relative condition of the propelling means with reference to the guideways, a second signal, and means to change the condition of the second signal on the continuance of such changed relative condition of the propelling means in excess of a determined interval.

3. A signaling system comprising a tube, a signal to indicate the condition within the tube, means to change the condition of the signal on a change of condition within the tube, a second signal, and means to change the condition of the second signal on the continuance of the changed condition within such tube in excess of a determined interval.

4. A signaling system comprising a plurality of tubes, a signal to indicate the condition within one of the tubes relative to another, means to change the condition of the signal on a change in the relative condition within such tubes, a second signal and means to change the condition of the second signal on the continuance of the change in relative condition within such tubes in excess of a determined interval.

5. A signaling system comprising a tube, a signal to indicate the occurrence of blockades therein, means to change the condition of the signal on the occurrence of a blockade in the tube, a second signal, and means to change the condition of the second signal on the continuance of a blockade in excess of a determined interval.

6. A signaling system comprising a tube, a signal to indicate the occurrence of blockades therein, means to change the condition of the signal on the occurrence of a blockade in the tube, a second signal, and means to automatically change the condition of the second signal on the continuance of blockade in excess of a determined interval.

7. A signaling system comprising a plurality of tubes, signals to indicate the occurrence of blockades in the respective tubes, means to change the condition of the signal allotted to a tube on occurrence of a blockade in such tube, a second signal, and means to change the condition of the second signal on the continuance of a blockade in excess of a determined interval.

8. A signaling system comprising a plurality of tubes, a signal individual to each of the tubes to indicate the condition of its respective tube, means to change the condition of the signal individual to each tube on occurrence of a blockade in the tube, another signal, and means to change the condition of such other signal on continuance of a blockade in excess of a determined interval.

9. A signaling system comprising a plurality of tubes, signals selectively operable to indicate the occurrence of blockades in the respective tubes, means to change the condition of the signal allotted to each tube on occurrence of a blockade in such tube, a second signal common to said plurality of tubes, and means to change the condition of the second signal on the continuance of a blockade in any tube in excess of a predetermined interval.

10. A signaling system comprising a tube, a signal to indicate the occurrence of blockades therein, means to change the condition of the signal on occurrence of a blockade in the tube, a second signal, means to initially change the condition of the second signal on the continuance of the blockade beyond a predetermined interval, means to thereafter maintain the second signal in such changed condition independent of the subsequent clearance of such blockade, and manually controlled means to restore the second signal to its previous condition.

11. A signaling system comprising a tube, a signal to indicate the occurrence of blockades therein, means to change the conditions of the signal on occurrence of a blockade in the tube, a second signal, a timing device set in operation on the occurrence of a blockade to initially change the condition of the second signal, means to thereafter maintain the second signal in such changed condition, and means to restore the timing device to its normal condition during the maintenance of the second signal in such changed condition.

12. A signaling system comprising a tube, a signal to indicate the occurrence of blockades therein, means to change the condition of the signal on occurrence of a blockade in the tube, a second signal, a timing device set in operation upon the occurrence of a blockade to initially change the condition of the second signal on the continuance of a blockade in excess of a predetermined interval and restored to normal condition subsequent to the operation of means to maintain the second signal in such changed condition, means to maintain the second signal in such changed condition, and means to prevent subsequent operation of the timing device during the maintenance of the second signal in such changed condition.

13. A signaling system comprising a tube, a signal to indicate the occurrence of blockades therein, means to change the condition of the signal on occurrence of a blockade in the tube, a second signal, a timing device set in operation on the occurrence of a blockade to initially change the condition of the second signal upon the continuance of a blockade in excess of a predetermined interval and restored to normal condition subsequent to the operation of means to maintain the second signal in such changed condition, means to maintain the second signal in such changed condition, means to restore the second signal to its previous condition, and means to prevent subsequent operation of the timing device until after the restoration of the second signal to its previous condition.

14. A signaling system comprising a plurality of tubes, a signal individual to each of the tubes to indicate the occurrence of a blockade in its respective tube, a second signal common to the plurality of tubes, means to change the condition of the signal individual to a tube on the occurrence of a blockade in such tube, and means to change the condition of the second signal on the continuance of a blockade in any of the tubes in excess of a determined interval.

15. A signaling system comprising a plurality of tubes, signals to selectively indicate the occurrence of blockades in the tubes, means individual to the tubes to selectively operate one of the signals upon occurrence of a blockade in one of the tubes, a second signal, a timing device set in operation on the occurrence of a blockade operative to change the condition of the second signal on the continuance of a blockade in excess of a predetermined interval, a controlling circuit for the timing device, means common to the first mentioned signals to change the condition of the controlling circuit on the occurrence of a blockade to set the timing device in operation, and a circuit governing the common means controlled jointly by the individual means and changed in condition by the operation of any one of the individual means in response to a blockade occurring in its respective tube.

16. A signaling system comprising a plurality of tubes, signals to selectively indicate the occurrence of blockades in the tubes, means individual to the tube to selectively operate one of the signals on the occurrence of a blockade in one of the tubes, a second signal, a timing device set in operation upon the occurrence of a blockade operative to change the condition of the second signal on the continuance of a blockade in excess of a predetermined interval, a controlling circuit for the timing device, means common to the first mentioned signals governing the controlling circuit and normally maintaining this circuit in open condition, and a normally closed circuit for the common means opened upon the operation of any one of the individual means.

17. A signaling system comprising a plurality of tubes, signals individual to the respective tubes to selectively indicate the occurrence of blockades in the tubes, means individual to each of said signals operated on the occurrence of a blockade in a tube to change the condition of the signal individual to such tube, a second signal, a timing device set in operation on the occurrence of a blockade operative to change the condition of the second signal on the continuance of a blockade in excess of a predetermined interval, a controlling circuit for the timing device, and means common to the means individual to the signals governing said controlling circuit and normally maintaining this circuit in open condition.

In witness whereof, I hereunto subscribe my name this 4th day of June, A. D. 1919.

GEORGE F. ATWOOD.